May 8, 1928.
D. M. LINDSAY
1,669,397
TUBE END TRIMMER
Filed June 1, 1926
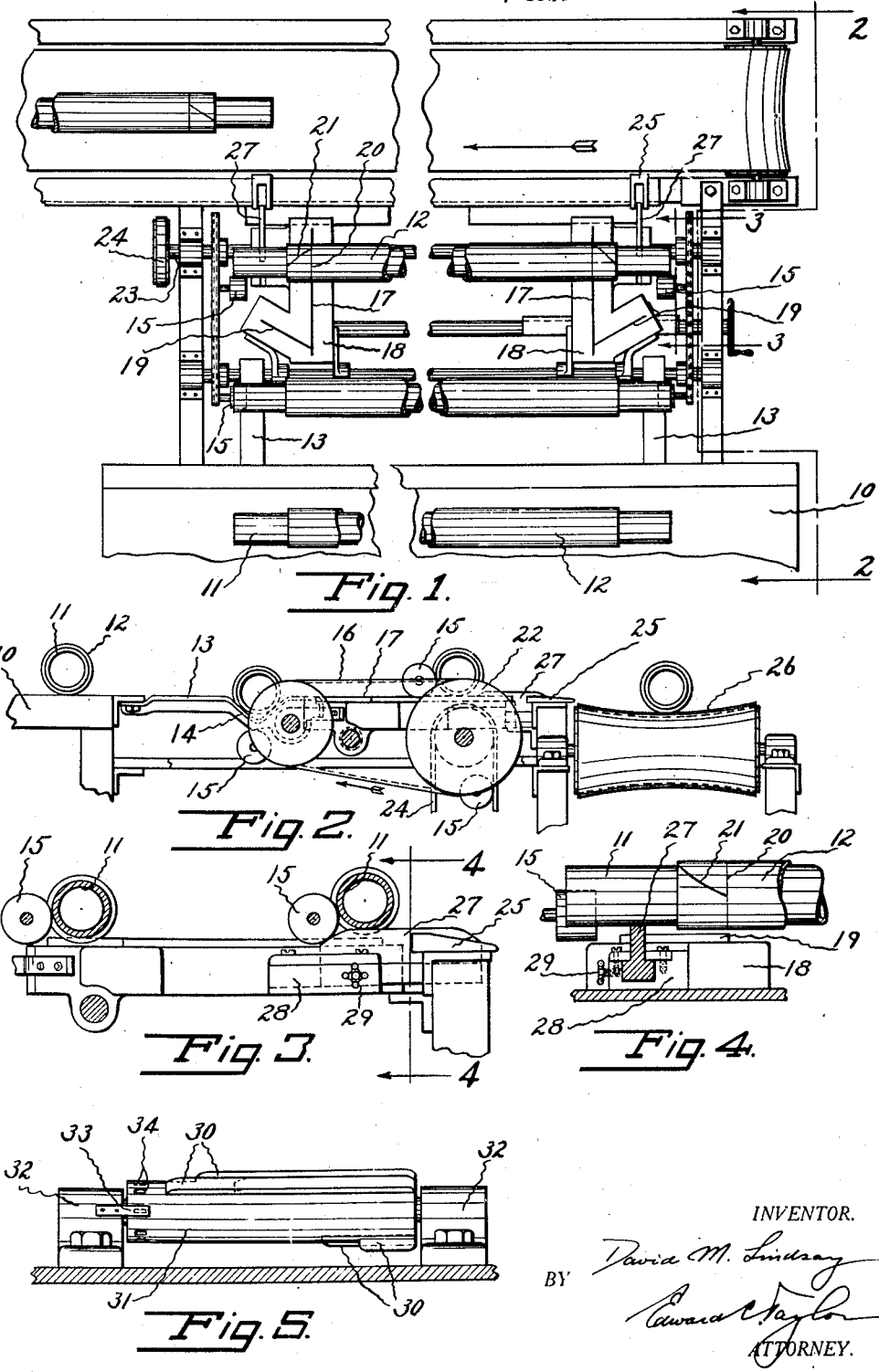
INVENTOR.
David M. Lindsay
BY
Edward C. Taylor
ATTORNEY.

Patented May 8, 1928.

1,669,397

UNITED STATES PATENT OFFICE.

DAVID M. LINDSAY, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

TUBE-END TRIMMER.

Application filed June 1, 1926. Serial No. 112,822.

This invention relates to a device for trimming uncured rubber tubes to length upon the mandrels upon which they are to be vulcanized. It has previously been proposed to carry the mandrels with the tubes upon them over electrically heated knives which sever the rubber stock as the mandrel rolls over them. In devices of this character, which are intended for use upon more than one size of tube, it is necessary to have the knife of a length equal to the circumference of the largest tube with which it is to deal. On this account the length of the knife is greater than the circumference of the smaller size tubes. If these tubes do not run across the knife absolutely true, the cut will be on a helix and after the tube has rolled a complete circumference a double cut will be made. It is the object of the present invention to provide means for stopping the contact of the tube with the knife after one revolution of the tube has been made, and thus to avoid the double cut referred to above.

Referring to the drawings,

Fig. 1 is a plan view of a portion of the device embodying my invention;

Fig. 2 is a view on line 2—2 of Fig. 1;

Fig. 3 is a section on line 3—3 of Fig. 1;

Fig. 4 is a section on line 4—4 of Fig. 3; and

Fig. 5 is a detail of a modification.

In Figs. 1 and 2 the customary tube rolling table is indicated at 10, with a mandrel 11 thereon carrying a tube 12. As fast as the tubes are formed upon the rolling table, they are pushed over onto tracks 13 where they follow one at a time into a recess 14 shown in Fig. 2. From this recess they are picked up by rolls 15 guided by conveyor chains 16 which push the mandrels slowly over electrically heated knives 17. These knives are each supported on a base 18 on substantially the same level as the track 13, the tracks themselves terminating so that the entire weight of the mandrel rests upon the knives. Besides the knives 17, which extend in the direction of the path of motion of the mandrels, knives 19 are provided extending at an angle. The straight knives 17 make a cut 20 circumferentially of the rubber tube, while the knives 19 make a cut 21 extending from the circumferential cut to the end of the tube, facilitating the pulling off of the trimmed end of the rubber. The driven sprockets 22 of the chains are shown as mounted upon a common shaft 23 driven by a chain 24. After the tubes have passed beyond the knives they are pushed by the rolls 15 over an inclined trackway 25, down which they roll to a delivery belt 26. Further deatils of this part of the construction need not be given as the same forms the subject-matter of an application for patent filed by another.

According to my invention I place beside the knives 17, at a point where contact will be made with the mandrels 11 but not with the tubes 12, a pair of supplementary tracks 27. These tracks are preferably rounded at their ends, as shown in Fig. 3, and are so placed with reference to the knives 17 that the mandrels are caused to ride upwardly out of contact with the knives after one revolution has been completed. In order to accommodate different sizes of tubes the supplementary tracks are preferably mounted as shown in Fig. 4, being held in guides 28 by a set screw 29. By loosening the set screw the tracks may be shifted longitudinally and re-clamped in position. In changing the adjustment to set the machine for a different size of mandrel, the trackway is shifted until its initial point of contact with the mandrel is so located as to raise the tube clear of the knife after a complete circumferential cut has been made.

In Fig. 5 I have shown a modification in which the supplementary trackway is formed by one or another of a series of ribs 30 formed upon the surface of a cylinder 31. This cylinder is supported upon bearings 32 and is held in any selected position by a spring detent 33 fitting into any one of a series of holes 34 upon the cylinder. The lengths of ribs 30 are chosen to correspond with the circumference of the sizes of tubes with which the machine is to deal, and when any given size is to be operated upon the cylinder is rotated until the corresponding rib 30 is uppermost. It is then held in position during the operation of the machine by the detent 33.

Having thus described my invention, I claim:

1. In a machine for trimming the end of rubber tubes, a knife along which the tube rolls, means for rolling the tube along the knife, and means for preventing contact of the tube with the knife after the tube has rolled a complete revolution.

2. A tube trimming machine of the type in which a tube mounted on a mandrel is rolled over a heated knife, characterized by the inclusion of a raised trackway upon which the mandrel is received to terminate its contact with the knife at a predetermined point of its revolution.

3. A tube trimming machine of the type in which a tube mounted on a mandrel is rolled over a heated knife, characterized by the inclusion of a raised trackway upon which the mandrel is received to terminate its contact with the knife at a predetermined point of its revolution, said trackway being adjustable to vary its point of contact with the mandrel.

4. A machine for trimming the ends of rubber tubes mounted on mandrels, comprising a knife along which the tube and mandrel roll, and means for elevating the tube above the knife after the tube has rolled a complete revolution.

DAVID M. LINDSAY.